(12) United States Patent
Vlaznev et al.

(10) Patent No.: US 11,119,806 B2
(45) Date of Patent: Sep. 14, 2021

(54) SYSTEM AND METHOD FOR AUTOMATICALLY SELECTING SECURITY VIRTUAL MACHINES

(71) Applicant: AO Kaspersky Lab, Moscow (RU)

(72) Inventors: Denis O. Vlaznev, Moscow (RU); Maxim E. Naumov, Moscow (RU); Maxim A. Vasilyev, Moscow (RU)

(73) Assignee: AO Kaspersky Lab, Moscow (RU)

( * ) Notice: Subject to any disclaimer, the term of this patent is extended or adjusted under 35 U.S.C. 154(b) by 323 days.

(21) Appl. No.: 16/512,597

(22) Filed: Jul. 16, 2019

(65) Prior Publication Data
US 2020/0257549 A1 Aug. 13, 2020

(30) Foreign Application Priority Data
Feb. 7, 2019 (RU) ............................ RU2019103364

(51) Int. Cl.
*H04L 29/06* (2006.01)
*G06F 9/455* (2018.01)

(52) U.S. Cl.
CPC ........ *G06F 9/45558* (2013.01); *H04L 63/145* (2013.01); *H04L 63/20* (2013.01); *G06F 2009/45587* (2013.01)

(58) Field of Classification Search
None
See application file for complete search history.

(56) References Cited

U.S. PATENT DOCUMENTS

| | | | | |
|---|---|---|---|---|
| 8,990,946 | B1 * | 3/2015 | Yarykin | G06F 21/64 726/24 |
| 9,088,618 | B1 * | 7/2015 | Gridnev | G06F 21/56 |
| 2007/0233698 | A1 * | 10/2007 | Sundar | G06F 11/2025 |
| 2019/0250937 | A1 * | 8/2019 | Thomas | G06F 9/45558 |
| 2019/0370131 | A1 * | 12/2019 | Mishra | G06F 21/53 |

FOREIGN PATENT DOCUMENTS

| | | | | |
|---|---|---|---|---|
| EP | 3246842 | A1 * | 11/2017 | G06F 21/55 |
| EP | 3246842 | A1 | 11/2017 | |

* cited by examiner

*Primary Examiner* — Joseph P Hirl
*Assistant Examiner* — Hassan Saadoun
(74) *Attorney, Agent, or Firm* — Arent Fox LLP; Michael Fainberg

(57) ABSTRACT

Disclosed herein are systems and methods of selecting security virtual machines (SVMs) for a virtual machine (VM) in a virtual infrastructure. In one aspect, an exemplary method comprises, forming a list of SVMs, wherein SVM performs security tasks for the VM, and VM includes a security agent configured to interact with the SVM, determining restriction requirements of the security agent and removing from the list SVMs not conforming to restriction requirements on limits of interaction area of the security agent, polling SVMs remaining on the list to determine network accessibility of said SVMs and removing inaccessible SVMs, for each accessible SVM remaining on the list, determining whether a marker of the SVM matches that of the security agent of the VM and removing SVMs whose markers do not match the marker of the security agent, and providing the list of remaining SVMs to the security agent of the VM.

20 Claims, 5 Drawing Sheets

SYSTEM AND METHOD FOR AUTOMATICALLY SELECTING SECURITY VIRTUAL MACHINES

CROSS REFERENCE TO RELATED APPLICATIONS

The present application claims priority to Russian Patent Application No. 2019103364, filed on Feb. 7, 2019, the entire content of which is incorporated herein by reference.

FIELD OF TECHNOLOGY

The present disclosure relates to the field of cybersecurity and, more specifically, to systems and methods automatic selection a security virtual machine in a virtual environment.

BACKGROUND

Cloud technologies have become indispensable part of modern computer technologies. Cloud technologies employ virtual machines, which in turn are functionally analogous to physical machines. In one aspect, the virtual machine (VM) is a program environment which virtualizes the computing environment inside the physical machine (such as a computer or server) making possible the operating system to work in the form of another computer. Several VMs can be used to form a virtual environment. A virtual environment is an aggregate of VMs running under the control of a hypervisor (or several hypervisors) on one or more physical machines (also known as the "host machine"). In this case, the VMs utilize the computing resources of the host machine, which is controlled by the hypervisor (i.e., by a monitor of the VMs).

The virtual machine, like any physical machine (such as a computing device, e.g., a personal computer) is vulnerable to attacks by malicious software (malware). Consequently, there is a need to use an antivirus system for protection of the VM. The antivirus system is designed to detect and remove malware. However, the realization of the antivirus system in a virtual environment introduces several technical issues. First, the VMs do not have a physical hard disk drive (HDD) and they make use of space allocated to them on the hard disk drive of the host machine on which they are created. Therefore, the input/output operations performed on the VMs result in a substantial burden on the processor of the host machine. The additional burden may even result in a prolonged freezing of the host machines as well as the VMs themselves while performing tasks. Consequently, there is a need for decreasing the number and volume of input/output operations performed on the VMs.

One approach to decrease the number of input/output operations is to use a distributed antivirus system in which tasks which arise due to efforts to protect the VM against malicious software are divided. In one example, the distributed antivirus system may consist the following components: a VM for performing tasks of an antivirus scan, which is also known as a Security VM (SVM); and security agents located on each VM in a network that needs to be protected. The security agents carry out two types of functions: a first function for monitoring the VMs, and a second function for interacting with the SVM. The interaction of the security agents with the SVM is for the transfer of data to the SVM for analysis, obtaining the results of an analysis of the data from the SVM, and receiving instructions from the SVM to perform the necessary actions on the VM depending on the obtained results.

However, this approach also has some disadvantages. For virtual infrastructures consisting of two or more host machines, a technology is typically employed to reduce the burden on the computing resources of one host machine by migrating the VM to another host machine having a lesser workload, wherein it may become necessary to reconnect the migrated VM to another SVM. It is usually no easy task to connect an security agent to the necessary SVM, since one needs to consider, all at once, many criteria and limitations which may arise. For example, there are rules that regular how the VMs operate in a particular virtual environment. For instance there may be one or more of: rules for regulating interaction among the VMs themselves as well as with the SVM, security policies regarding both user restrictions and corporate restrictions, limits on locations of the VMs in a network and areas of their interaction, and so forth. To illustrate by way of an example, a situation may arise where, according to requirements of the security policy of a client's company, the data of different groups of VMs must not be located at the same network point, i.e., in the same database or on the same SVM. In another situation, when using an automatic selection of a SVM for a connection, the VM might perform a connection to a SVM located in a different cluster or data center, even though this might be prohibited by the security policies. Further complicating this approach, the routing between the VM and the SVM, if located in different clusters or data centers, might be organized such that it will contain routes through networks in different hemispheres of the planet, which complicates the functions of the VM.

Moreover, the antivirus system also needs to take into account that jeopardize the ability of the SVM to function properly. For example, when there are a significant number of VMs being deployed within a single host machine, the workload on the SVM also increases, which may result in the SVM itself failing. In another example, the connection between VM and SVM may break. Therefore, in the context of a distributed approach, the antivirus protection of VMs becomes difficult to deliver, if not entirely impossible.

Thus, there is a need for a solution which satisfies the security policies while selecting SVMs for connecting security agents located on VMs.

SUMMARY

Aspects of the disclosure relate to the field of computer security, more specifically to systems and methods of selecting security virtual machines (SVMs) for a virtual machine (VM) in a virtual infrastructure.

In one exemplary aspect, a method of selecting SVMs is implemented in a computer comprising a hardware processor, the method comprising: forming a list of SVMs, wherein SVM performs security tasks for the VM, and VM includes a security agent configured to interact with the SVM, determining restriction requirements of the security agent and removing from the list SVMs not conforming to restriction requirements on limits of interaction area of the security agent, polling SVMs remaining on the list to determine network accessibility of said SVMs and removing inaccessible SVMs, for each accessible SVM remaining on the list, determining whether a marker of the SVM matches that of the security agent of the VM and removing SVMs whose markers do not match the marker of the security agent, and providing the list of remaining SVMs to the security agent of the VM.

According to one aspect of the disclosure, a system is provided for selecting SVMs, the system comprising a hardware processor configured to: form a list of SVMs, wherein SVM performs security tasks for the VM, and VM includes a security agent configured to interact with the SVM, determine restriction requirements of the security agent and remove from the list SVMs not conforming to restriction requirements on limits of interaction area of the security agent, poll SVMs remaining on the list to determine network accessibility of said SVMs and remove inaccessible SVMs, for each accessible SVM remaining on the list, determine whether a marker of the SVM matches that of the security agent of the VM and remove SVMs whose markers do not match the marker of the security agent, and provide the list of remaining SVMs to the security agent of the VM.

In one exemplary aspect, a non-transitory computer-readable medium is provided storing a set of instructions thereon for selecting SVMs, wherein the set of instructions comprises instructions for: forming a list of SVMs, wherein SVM performs security tasks for the VM, and VM includes a security agent configured to interact with the SVM, determining restriction requirements of the security agent and removing from the list SVMs not conforming to restriction requirements on limits of interaction area of the security agent, polling SVMs remaining on the list to determine network accessibility of said SVMs and removing inaccessible SVMs, for each accessible SVM remaining on the list, determining whether a marker of the SVM matches that of the security agent of the VM and removing SVMs whose markers do not match the marker of the security agent, and providing the list of remaining SVMs to the security agent of the VM.

In one aspect, markers are assigned to SVMs by: dividing VMs in the virtual infrastructure into a plurality of zones based on locations and security policy requirements for data being processed on the VMs; for each zone, assigning the locations of the VMs in the zone to a respective control group having a separate security policy; assigning a distinct marker to each control group; dividing SVMs into a plurality of groups of SVMs based on zones for which the SVMs perform security tasks; and for each group of SVMs, assigning, to all SVMs in the group, markers of the control groups for which the SVMs perform security tasks.

In one aspect, the dividing of the SVMs into the plurality of groups of SVMs if further based on types of antivirus scans performed by the SVMs.

In one aspect, the control group is used to restrict VMs to use a predesignated SVM.

In one aspect, the restriction requirements on limits of interaction area of the security agent include restrictions based on geographical and virtual locations, wherein the virtual location is a location of a VM on which the security agent is installed, the location of the VM being a geographical location of a physical machine on which the VM is deployed.

In one aspect, the interaction area of the security agent is divided into any number of levels, the levels of the interaction area including at least one of: a level based on the physical machine on which the virtual machine is deployed; a level based on the cluster to which the virtual machine belongs; and a level based on the data center in which the physical machine containing the virtual machine resides.

In one aspect, the restriction requirements include at least one of: security policies specified by a user; a geographical location of a physical machine on which the VM is deployed; and requirements on processing of personal data on the VM and on the SVM.

For an effective utilization of the benefits of a distributed antivirus system, it is necessary to provide the balancing/ rebalancing of workload on SVMs while simultaneously adhering to limitations due to restriction requirements for selection of the SVM or the corresponding area for subsequent connection of security agents of the virtual machines.

The method of the present disclosure advantageously enables a more effective solution for the problem of automating the process of restricting the area of the virtual environment for selection of the SVM for a connection of a virtual machine, both during an initial deployment of the virtual machine and during a reconnection of the virtual machine to a different SVM, for example, when the virtual machine is being migrated to a different host machine. The method addresses the problem of balancing the workload on the SVM while allowing for the automatic limitation of the area of selection of the SVM. The creation of a group of SVMs for the automatic selection of a SVM for the connection of the virtual machine security agent in accordance with the teachings of the present disclosure improves antivirus systems. The present disclosure describes a method and system that addresses the aforementioned drawbacks and problems. The improvement is achieved by: forming a list of SVMs, wherein SVM performs security tasks for the VM, and VM includes a security agent configured to interact with the SVM, determining restriction requirements of the security agent and removing from the list SVMs not conforming to restriction requirements on limits of interaction area of the security agent, polling SVMs remaining on the list to determine network accessibility of said SVMs and removing inaccessible SVMs, for each accessible SVM remaining on the list, determining whether a marker of the SVM matches that of the security agent of the VM and removing SVMs whose markers do not match the marker of the security agent, and providing the list of remaining SVMs to the security agent of the VM.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program of automatically selecting security virtual machines (SVMs) for the automatic selection of a SVM for security agents of the virtual machines (VM) in the virtual infrastructure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

In order to present the teachings of the present disclosure with clarity, the following approach has been used for the numbering: when the number of an object occurs in the description that does not have a letter associated with it, then the statement being described pertains to all objects containing that numerical part. For example, the term "physical machine 100" in the description refers to any of the physical machines: 100a, 100b, . . . , 100n. In contrast, when a complete numbering is given in the description of an object, then the description pertains to the specific object in the figure (for example, the physical machine 100a or the virtual machine 120a).

The present system is designed for automatically limiting the interaction area of security agents residing on virtual machines with SVMs. The method of the present disclosure operates by: automatically creating a list of SVM for subsequent selection of a SVM and connection of an security agent residing on a virtual machine to at least one SVM on the created list. The list of SVMs includes an ordered set of SVMs. This approach enables the system to satisfy various restrictions on interactions between VMs and SVMs. The restrictions are either contained as rules in security policies or as rules which have been established by users. Moreover, with the aid of the method of creating a list of accessible SVMs for each virtual machine and selecting from among the accessible SVMs, the method of the present disclosure advantageously enables balancing the workload of the SVM while taking into account the existing restrictions on interactions of the virtual machines and the SVMs.

Figure 1:
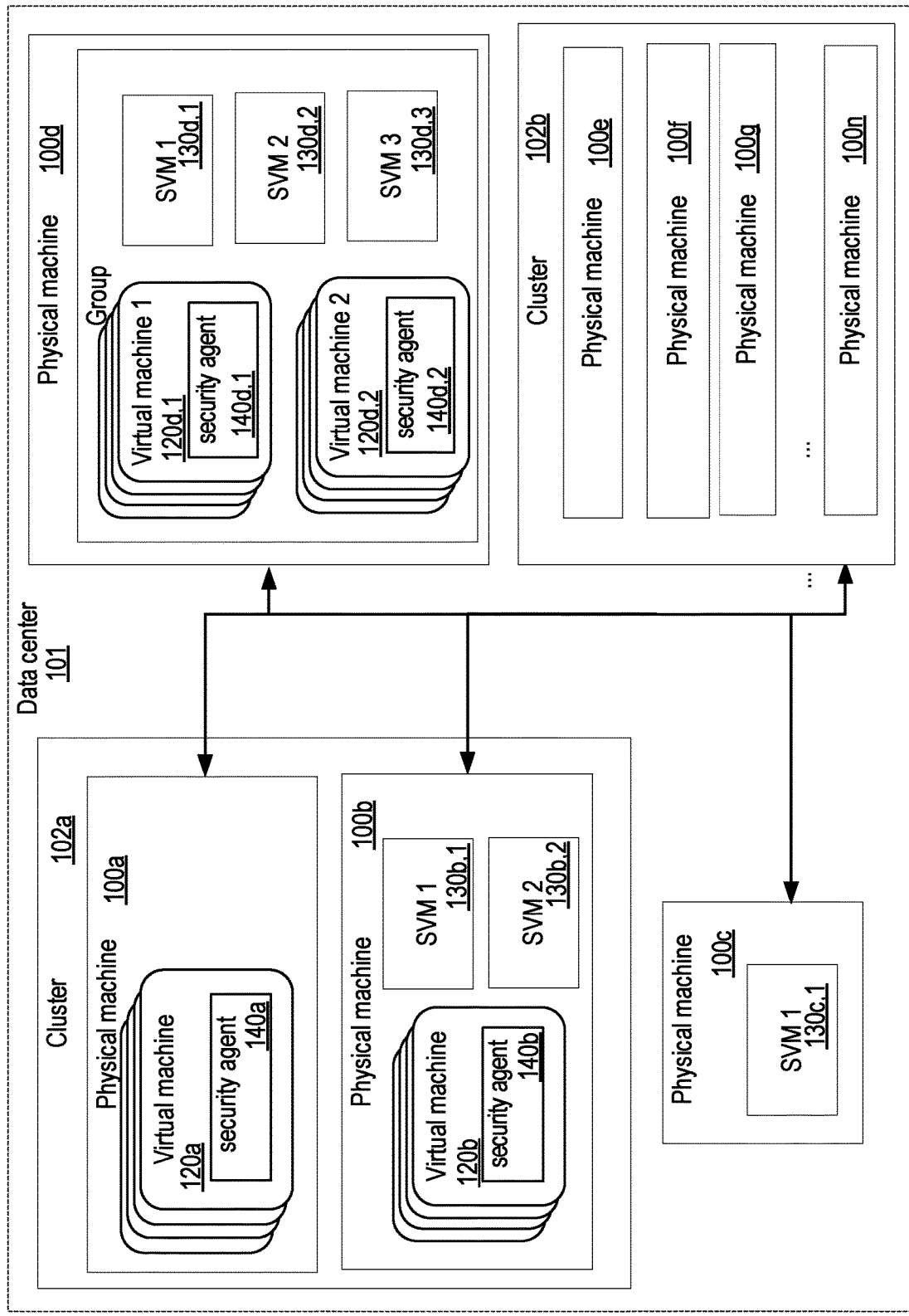
FIG. 1 illustrates an example of a virtual infrastructure for which the method of the present disclosure is used in accordance with aspects of the present disclosure.

FIG. 1 illustrates an example of a virtual infrastructure for which the method of the present disclosure is used. The virtual infrastructure includes an aggregate of virtual machines and security virtual machines, as well as a system for communication and control of the virtual machines and the security virtual machines. It should be noted that, in the general case, a hypervisor may also be realized as a virtual machine.

The virtual infrastructure of FIG. 1 includes a data center 101. The data center 101 includes physical machines 100a-100n.

The virtual infrastructure may include a sizable number of virtual machines (e.g., ranging from several machines to hundreds of machines). The presence of a sizeable number of virtual machines (VMs) requires a corresponding volume of computing resources. Therefore, the virtual machines may be created on a single physical machine (for example, the physical machine 100a) or on a group of physical machines 100a-100n, with the group of physical machines being combined into clusters. A "cluster" is an aggregate of physical machines (or hypervisors) which are unified by corresponding features or properties. For example, one cluster may bring together physical machines which are located in a same data center or which pertain to a same corporate network of a particular organization. The virtual machines, in turn, may be combined into groups, as needed. One particular group of virtual machines might be formed by a most diverse of features, such as: the virtual machine name mask, the IP address, the geographical location, the function being performed, the signs of the presence of a threat, and so on. For example, a first group may bring together virtual machines, including SVMs, which exist in the corporate network of a specific organization; a second group may bring together virtual machines which are performing a similar type of data processing; a third group may bring together virtual machines according to their purpose or functionality.

For the infrastructure of FIG. 1, the physical machine 100a includes virtual machine 120a. The physical machine may be either a personal computer (computer) or a server, an example of which is described in FIG. 5.

Physical machine 100b includes virtual machine 120b, and two security virtual machines SVM-1 and SVM-2. The physical machine 100c includes no virtual machines but includes a security virtual machine SVM-1. Physical machine 100d includes two virtual machines, shown as elements 120d,1 and 120d,2. In addition, the physical machine 100d includes three security virtual machines: SVM-1, SVM-2, and SVM-3. For consistency, SVM-1 of the physical machine 100b is shown as element 130b,1 and SVM-2 of the physical machine 100b is shown as element 130b,2, the SVM-1 of physical machine 100c is shown as element 130c,1, the SVM-1 of the physical machine 100d is shown as element 130d,1, the SVM-2 of the physical machine 100d is shown as element 130d,2, and the SVM-2 of the physical machine 100d is shown as element 130d,3. Similarly, the other physical machines may include any number of virtual machines and SVMs.

At least some of the physical machines 100a-100n are brought together to form clusters. For example, physical machine 100a and 100b are brought together to form cluster 102a, and physical machines 100e-100n are brought together to form cluster 102b. Physical machines 100c and 100d are in clusters that include only one physical machine. In addition, groups may be formed bringing together virtual machines and SVMs. For example, the virtual machine 120d,1, the virtual machine 120d,2 and the SVM 130d,1, SVM 130d,2 and SVM 130d,3 may be brought together to form group 1, as shown in FIG. 1.

It should be noted that the location of the physical machines themselves may be different: ranging from computers physically located in the same room (such as an office, a data center, and so on) to a location of the physical machines in different data centers having a different geographical location. For example, a virtual infrastructure may consist several hundred virtual machines which are deployed on several dozen physical machines, which in turn are distributed among several data centers located in different territories, such as the territories of countries like: Russia, the USA, and Germany. To simplify, for the description of the present disclosure, the physical machines shown in FIG. 1 are present in a single data center, but there is no such limitation for deployment of aspects of the present disclosure.

In one aspect, the present disclosure describes an antivirus protection for virtual machines that is realized by: installing an antivirus security agent 140 (hereinafter, the security agent) on each virtual machine 120 deployed on each physical machine 100, and deploying at least one security virtual machine 130 on each physical machine 100. In other words, on a given physical machine, e.g., 100d, suppose n virtual machines are deployed, e.g., n=2. Then, for each of the n virtual machines, a respective antivirus security agent is deployed, e.g., 140d,1 for virtual machine 1 and 140d,2 for virtual machine 2. In addition, at least one SVM 130 is deployed on each physical machine (e.g., SVMs shown as elements 130d,1-130d,3 of physical machine 100d). The antivirus security agent 140 is installed and used for interaction with the SVMs 130. The workload of the SVMs is checked for the purpose of balancing workload among a plurality of SVMs. It should be noted that the SVM 130 is similar to the virtual machine 120, with the only difference being the purpose and functional tasks of the SVM being different from that of the virtual machine. As such, the SVM 130 may be instantiated in a physical machine in a similar manner. It is also worth noting that the virtual machines 120 may perform the functions and tasks of either a personal computer or a server.

In one aspect, with the exception of the labor intensive tasks described above, the security agent 140 is used for performing the function of continuous antivirus protection of the virtual machine 120 by an existing functionality. For instance, the security agent 140 is used for checking events occurring in the operating system of the virtual machine 120. The checking of the events occurring in the operating system of the virtual machine 120, as a rule, is not considered as a labor intensive process from the standpoint of utilization of computing resources, such as processor and hard disk. The existing functionality includes various methods of antivirus scanning. In contrast, the labor intensive tasks of the antivirus scan are directed by the security agent 140 towards the security virtual machine 130 to which the security agent 140 is connected.

In one aspect, the security virtual machine 130 for the purpose of performing the labor intensive tasks of the antivirus scan contains at least a scanning module (not shown in FIG. 1). The scanning module is software which is designed to perform an antivirus scan of data (files or portions thereof) received from the security agent 140, which is installed on the virtual machine 120. In turn, the scanning module of the security virtual machine 130 may contain a series of other modules, such as an analysis module and an antivirus database, in order to perform its purposes. The result of the analysis is directed by the SVM 130 to the security agent 140 from which the request with a corresponding antivirus scan task was received.

In one aspect, the SVM 130 may further contain a series of other different modules. Examples of such modules might be a module for updating antivirus databases, a module to check licenses, and so on. It should be noted that the module for updating the antivirus database performs an updating of antivirus database versions, both for antivirus database versions used during the scanning directly on the SVM 130 and those used by the security agents 140, depending on the aspect of the antivirus protection.

Moreover, the SVM 130 may have connections to several virtual machines 120 at the same time (e.g., the SVM 130*a* is connected to the virtual machine 120*a*). Then, the SVM 130 may also contain a scheduler for facilitating sharing of the resources of the SVM 130 by several virtual machines. The scheduler is designed to form a queue for performing the antivirus scan on the SVM 130 in the event of receiving more than one request for an antivirus scan, or when performing an antivirus scan by different antivirus scan methods. In one aspect, the scheduler may assign priorities to antivirus scan tasks when forming the queue. In one aspect, the queue is formed according to a time of receiving the antivirus scan tasks. In one aspect, the queue is formed according to the prioritization of the antivirus scan tasks. In one aspect, the queue may be formed according a combination of the time of receiving the antivirus scan tasks and the prioritization of the antivirus scan tasks. In one aspect, the priorities may be assigned to the antivirus scan tasks according to the required antivirus scan methods, for example if an "on access scanning" method is required, there will be one priority, but if an "on demand scanning" method is required, there will be another priority. In yet another aspect, the prioritization of tasks may be based on requests for the start of the scan based on priorities of the virtual machines 120 themselves.

In one aspect, the SVM 130 contains an integrator (not shown in FIG. 1). The integrator lets the SVM 130 receive information from a hypervisor, interact with other SVMs 130 and dispatch information to the virtual machine 120. The hypervisor provides the integrator with information containing at least data about the virtual machines which are controlled by the hypervisor, and data on the current workload on the computing resources of the physical machine 100 which are provided to the SVM 130. During the interaction of the security virtual machines 130 with the integrator, there is an exchange of information containing data about at least one of: the location of the SVM, the current connections with virtual machines or the workload at the current moment of time. The integrator presents the received information to the virtual machines on request. The sending of the information to the virtual machines may occur in accordance with a pre-determined period of time, for example every 5-10 seconds. Depending on the aspect of the present disclosure, the integrator may reside on: one of the SVMs, on one virtual machine, or on the physical machine.

It should be noted that, when a group of virtual machines is present, each group of virtual machines 120 will contain at minimum one SVM 130, making optimal antivirus protection of the virtual machine possible, wherein the group of virtual machines may either be divided up among several physical machines or located within a single physical machine. Some examples of aspects are shown in FIG. 1. Thus, two or more SVMs reside on a single physical machine (for example, three SVMs 130*d* reside on the physical machine 100*d*). The physical machine 100*c* is assigned only to the SVM 130*c*, which will be connected to virtual machines from other groups and/or clusters of physical machines. The physical machine 100*a* has no SVM, and therefore the group of virtual machines 120*a* will interact with the SVMs from other physical machines. For example, since physical machines 100*a* and 100*b* are assembled into a same cluster 102*a*, the group of virtual machines 120*a* may interact with one of the SVMs 130*b* (i.e., 130*b*,1 or 130*b*,2) deployed on the physical machine 100*b*.

In one aspect of the present disclosure, the virtual infrastructure is created for a corporate virtual environment within which virtual machines are formed for enabling a creation of user work stations. In such virtual infrastructures, when a new virtual machine is deployed on a particular physical machine or when a virtual machine migrates to a different physical machine, to a different cluster, or to a different data center, a problem of finding, selecting, and connecting the virtual machine to a SVM will arise. The corporate environment typically imposes a number of restriction requirements involving the interaction of the virtual machine with other virtual machines and SVMs. A number of such restriction requirements may involve restrictions for sending data from one virtual machine to another virtual machine and the subsequent processing thereof. In some instances, the data may include personal data of the clients of the virtual machine. Thus, for example, the restriction requirements may characterize legislative requirements of different countries regulating processing of such data. For example, Federal Act No. 152-FZ of the Russian Federation "On personal data" and the GDPR (General Data Protection Regulation) protecting personal data of EU citizens.

Moreover, in virtual infrastructures and especially those bringing together dozens of SVMs and hundreds of virtual machines, it is also necessary to carry out the task of balancing the workload on the SVMs in order to reduce the likelihood of overloading the SVMs deployed in a network. At the same time, when using an automatic selection of SVMs, when not allowing for restriction requirements, the security agent of the virtual machine utilizes the full array of available SVMs in the network, which will result in consumption of computing resources. For example, it may connect to a SVM whose location is rather remote (in a different cluster or data center), and in this case, the traffic from the security agent to the SVM will go beyond the perimeter of the cluster, or even the data center, in which the virtual machine is located. This type of connection results in complexity in data routing and lowers the data transmission speed. Moreover, if the virtual machine belongs to a corporate infrastructure, various prohibitions and restrictions may be imposed, both on the interaction between virtual machines and on the locations of the virtual machines and the physical machines on which the virtual machines and SVMs are deployed. Such restrictions might not be considered when using an automatic connection without the benefit of the method of the present disclosure.

Yet another characteristic of SVMs is that various tasks, such as antivirus scan tasks, may be divided up among different SVMs, or security policies might be installed to restrict the interaction of virtual machines with SVMs. Moreover, the dividing might be done among the security agents 140 themselves of the virtual machine 120, i.e., a particular security agent should interact only with at least one particular SVM 130. In this case, the virtual machines (security agents) and the SVMs are endowed with certain criteria which need to be considered when connecting the security agents of the virtual machines to the SVMs. In one aspect, such criteria are markers (tags) making a determination of the possibility of an interaction of a virtual machine with a SVM possible. Consequently, they must be considered when connecting to the SVM. An example of the use of markers is presented in FIG. 2.

Figure 2:
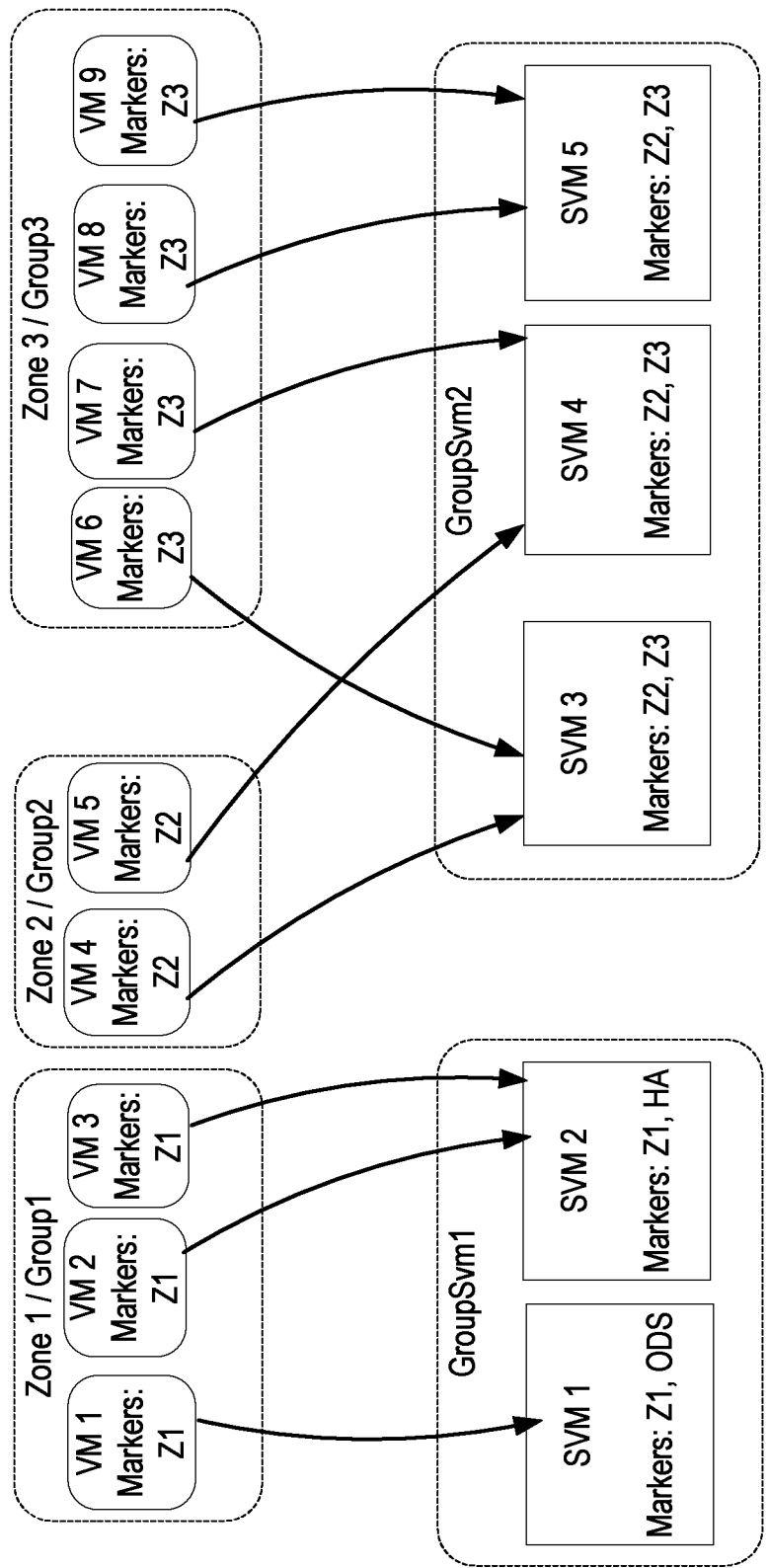
FIG. 2 illustrated an example of a formation of markers for virtual machines in order to use the markers when selecting an SVM from a restrictive list of SVMs.

FIG. 2 illustrated an example of a formation of markers for virtual machines in order to use the markers when selecting an SVM from a restrictive list of SVMs. Referring to FIG. 2, groups of virtual machines are divided into 3 zones: Zone 1, Zone 2 and Zone 3. Suppose it is assumed that there are security policy requirements that specify that the data being processed on the virtual machines from Zone 1 should not intersect with the data being processed in other zones (Zone 2 and Zone 3). Five SVMs have been deployed for the protection of all the virtual machines. It is also assumed that two SVMs (SVM 1 and SVM 2) are assigned to interact with the virtual machines from Zone 1. The other three SVMs (SVM 3, SVM 4 and SVM 5) are presented for protection of the virtual machines from the remaining zones (Zone 2 and Zone 3).

In order to implement the aforementioned security policy requirement, the assignments of SVMs must conform to the following criteria:

1) assign the location of the virtual machines from different zones to different control groups (for example, Zone 1 to "Group1", Zone 2 to "Group2", and Zone 3 to "Group3");

2) each group is determined by a separate security policy, and will be given different markers, for example, "Z1" is the marker for Group1, "Z2" for Group2 and "Z3" for Group3;

3) the indicated SVMs are distributed among different groups as:

the SVMs assigned to protect Zone 1 are in group "GroupSvm1";

the SVMs assigned to protect Zone 2 and Zone 3 are in group "GroupSvm2";

4) the marker "Z1" is assigned to all SVMs of group "GroupSvm1";

5) the markers "Z2, Z3" are assigned to all SVMs of group "GroupSvm2", marker "Z2" for Zone 2 and marker "Z3" for Zone 3.

Thus, after the assignments, the groups will appear as:

Group1 (marker "Z1" assigned by the policy): virtual machine 1, virtual machine 2 and virtual machine 3;

Group2 (marker "Z2" assigned by the policy): virtual machine 4 and virtual machine 5;

Group3 (marker "Z3" assigned by the policy): virtual machine 6, virtual machine 7, virtual machine 8 and virtual machine 9;

GroupSvm1 (marker "Z1" assigned by the policy) SVM 1 and SVM 2;

GroupSvm2 (markers "Z1, Z2" assigned by the policy): SVM 3, SVM 4 and SVM 5.

As a result, the security agents 140 of the virtual machine 120, in seeking the SVM 130 for selection and interaction, will have to consider the requirements of the policies, i.e., the compliance of the markers. For example, the virtual machines from Group 1 have the marker "Z1", and therefore the security agents of those virtual machines should interact with security virtual machines having the same marker "Z1". In turn, the security agents of the virtual machines of Group 2 and Group 3 can be connected to SVMs with markers "Z2" and "Z3". Consequently, when creating the list of SVMs for each security agent, it is necessary to consider the indicated restriction requirements of the policies.

In yet another aspect, the markers may also indicate, for example, the kinds of antivirus scan. Thus, SVM 1 may have designated as an additional marker ODS (on demand scanning), while SVM 2 may have HA (heuristic analysis). Consequently, depending on the type of marker for the SVM, the VM will be connected to one SVM or another. For example, VM 1 required performing a scanning on demand. According to marker "Z1", virtual machine 1 is able to interact with two SVMs (SVM 1 and SVM 2), but since it is necessary to perform an on demand scan, virtual machine 1 will interact with SVM 1.

In another aspect, markers may be designated also when it is necessary to restrict a particular group of virtual machines to the use of a particular SVM.

Thus, each SVM has its own list of markers on the basis of which the security agents of the virtual machines will perform a selection of a SVM for connection. The markers of the SVM may be assigned either by an administrator through security policies in effect in the virtual infrastructure during the creating of the SVM, or automatically on the basis of supplemental security policies. For example, the supplemental security policies may consider requirements on the fault tolerance, safety, or speed of interaction of the virtual machine and the SVM. A changing of the markers of the SVMs during the course of their use is also possible.

Figure 3:
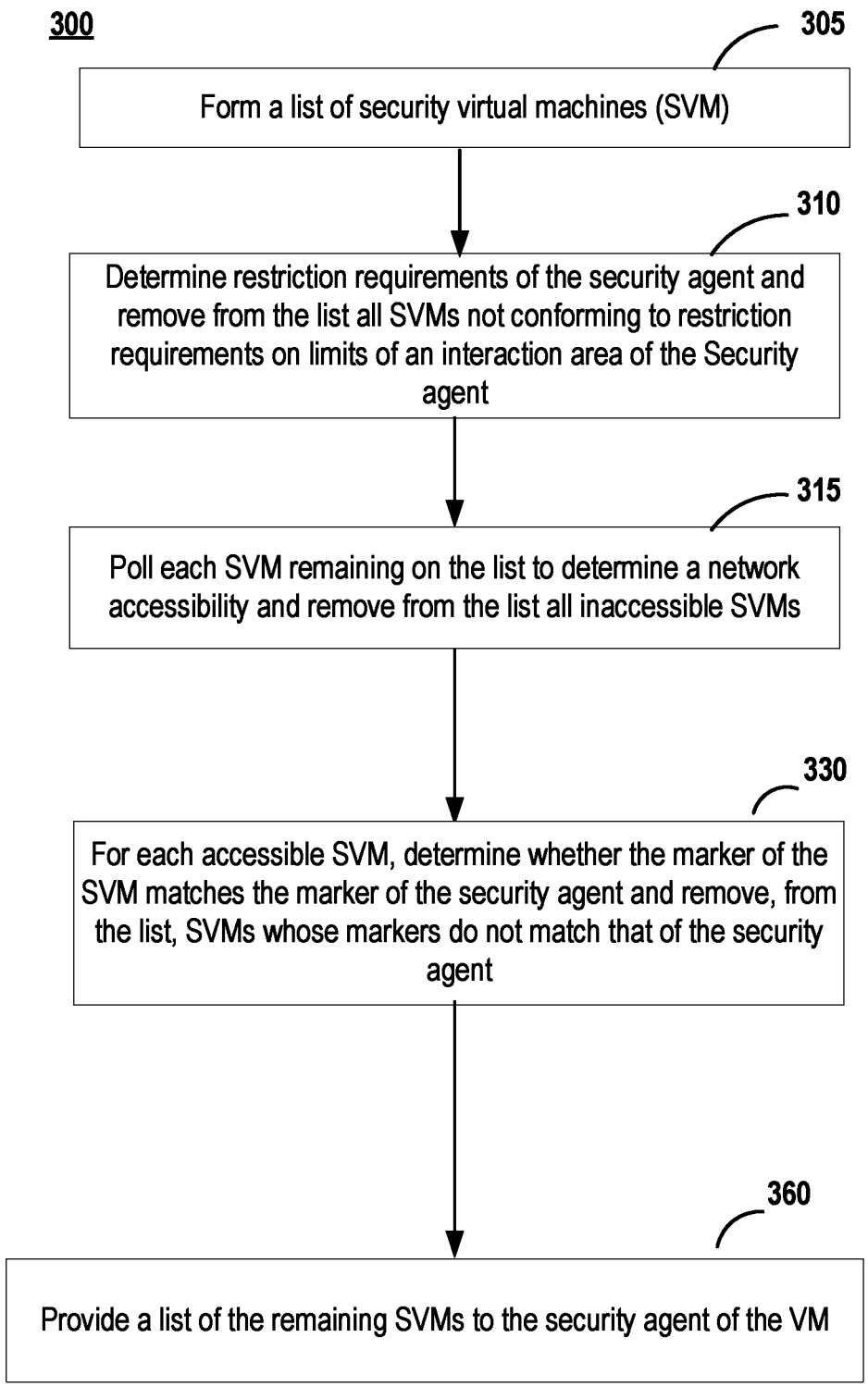
FIG. 3 illustrates a method for automatic selection of a SVM for a security agent.

FIG. 3 illustrates a method 300 for automatic selection of a security virtual machine for a security agent. The security agent may be residing on a new virtual machine or a virtual machine which is being migrated, for example, to another virtual network or cluster, or to a physical machine. In other words, the method 300 supports restrictions, e.g., restricting the area of automatic selection of a security virtual machine to satisfy the restriction requirements of security policies which are specific to different clients and different information infrastructures (IT infrastructure).

In one aspect, a subset of SVMs is formed by creating a list which allows a consideration of restriction requirements on the interactions between the virtual machines and the SVMs. As an example of possible restriction requirements, one may consider requirements relating to the virtual location of the virtual machines, the geographical location of the physical machines on which the virtual machines and/or the security virtual machines are deployed, and the correctness of the connection to the SVM based on an analysis of the markers assigned to SVM 130 and virtual machine 120.

In yet another aspect, the method of the present disclosure enables a selection of an optimal SVM 130 from the standpoint of the workload upon connecting the security agent 140 of the virtual machine 120 to the SVM 130.

Two variants are possible for the selection of a SVM for connection of the security agent of a virtual machine. The first is used when the security agent of the virtual machine is not yet connected to any SVM, i.e., the virtual machine has just appeared in the network. The second variant is used when the security agent is connected but needs to select a new SVM, for example on account of migration of the virtual machine to another physical machine, a need to balance the workload on the connected SVM, or in the event that the connection with the current SVM is broken. It is therefore necessary to form a list of SVMs, which will be accessible and will conform to the current restriction requirements for interaction of the virtual machine and the SVM.

In step 305, using the security agent itself or an integrator (depending on aspects of the present method that are implemented), method 300 forms a list of SVMs. The SVMs on the list perform security tasks for VMs in the virtual infrastructure. The VM includes a security agent configured to interact at least with one SVM.

In one aspect, the formation of the list of SVMs comprises: gathering information on the SVMs residing in the virtual infrastructure. In one aspect, the gathering of the information comprises at least one of:

1) reading corresponding security policies of the SVMs, wherein the security policies include a list of addresses of the SVMs in the network, polling each SVM to obtain markers associated with the polled SVM and a specified level of an interaction area of the polled SVM with regard to the security agent of the virtual machine;

2) sending a request to an integrator indicating a level of the interaction area required by the security agent, and receiving from the integrator a list of known SVMs; and 3) broadcast polling of an entire virtual infrastructure, i.e., making a connection to a certain broadcasting group in which the SVMs announce information packets with a certain periodicity.

It is noted that all of the above methods may be used simultaneously to gather the information and create the list of all known SVMs.

In step 310, with the aid of the security agent itself or the integrator, method 300 determines restriction requirements of the security agent and removes from the list all SVMs not conforming to restriction requirements on limits of an interaction area of the security agent—thereby creating a list of SVMs to be polled. In one aspect, the restriction requirements are used to establish the interaction area of the security agent which defines the boundaries within which the SVMs, to which the security agent can connect are located, the boundaries being characterized by locations in the virtual infrastructure. One such criterion is a restriction on the area within which the interaction should occur.

In one aspect, the interaction area of the security agent is divided into any number of levels, for example, the levels of the interaction area might be:

a level based on the physical machine (host machine), on which the virtual machine is deployed;

a level based on the cluster to which the virtual machine belongs (at least one host machine); and a level based on the data center in which the physical machine containing the virtual machine resides.

In one aspect, the restriction requirements includes restrictions designated by an administrator of the Information Technology (IT) infrastructure through various control systems, for example, the Kaspersky Security Center of the firm Kaspersky Lab AO. The IT infrastructure may be centralized, distributed, or mixed. Kaspersky Security Center enables maximum simplification of the control of the security of the virtual machine by designating unified security policies. For example, the security policies may contain requirements, including restriction requirements, on data transmission routes, the interaction between virtual machines, the regulating of the data transfer speed, the stability of the interaction channel, and so forth.

In one aspect, when the list of all known SVMs is formed in step 305 by sending a request to the integrator, the removal of SVMs not conforming to the restriction requirements in step 310 is also performed with the aid of the integrator. Thus, steps 305 and 310 are performed by the integrator.

Depending on aspects of the present disclosure which are implemented, the levels of the interaction area within which the SVMs need to be located with respect to the security agents of the virtual machine for the connection are characterized both by the virtual location and by the geographical location. When both the virtual and geographical locations are used, restrictions of security policies may be considered for regulating the transfer of data in a network and the possibility or impossibility of gathering information from different virtual machines on the same SVM. In particular, requirements for processing of personal data may be considered. The requirements for processing of personal data may contain restrictions corresponding to laws on personal data of users in a country: on whose territory the physical machine (host machine) is located, on which physical machine the virtual machine is deployed, and on which virtual machine the security agent or SVM is in turn installed.

In step 315, method 300 polls each SVM remaining on the list to determine a network accessibility and removes from the list all inaccessible SVMs. For each polled SVM, the method determines whether a network access to the SVM exists. The SVMs that are polled and are found as being inaccessible are removed from the list. If there is a network access to the SVM, the method proceeds to step 330.

In step 330, method 300, for each accessible SVM, determines whether or not the marker of the SVM matches the marker of the security agent and removes from the list all SVMs whose markers do not match the markers of the security agent.

In step 360, method 300 provides a list of the remaining SVMs to the security agent of the VM. The remaining list contains the SVMs which conform to the restriction requirements on the interaction with the security agent 140 of the virtual machine 120. The security agent 140 may then make a selection from the list of SVMs and a connection to the selected SVM may be established.

In one aspect, the markers are assigned to SVMs by: dividing VMs in the virtual infrastructure into a plurality of zones based on locations and security policy requirements for data being processed on the VMs, for each zone, assigning the locations of the VMs in the zone to a respective control group having a separate security policy, assigning a distinct marker to each control group, dividing SVMs into a plurality of groups of SVMs based on zones for which the SVMs perform security tasks, and for each group of SVMs, assigning, to all SVMs in the group, markers of the control groups for which the SVMs perform security tasks.

In one aspect, the dividing of the SVMs into the plurality of groups of SVMs if further based on types of antivirus scans performed by the SVMs.

In one aspect, the control group is used to restrict VMs to use a predesignated SVM.

In one aspect, the restriction requirements on limits of interaction area of the security agent include restrictions based on geographical and virtual locations, wherein the virtual location is a location of a VM on which the security agent is installed, the location of the VM being a geographical location of a physical machine on which the VM is deployed.

In one aspect, the interaction area of the security agent is divided into any number of levels, the levels of the interaction area including at least one of: a level based on the physical machine on which the virtual machine is deployed, a level based on the cluster to which the virtual machine belongs, and a level based on the data center in which the physical machine containing the virtual machine resides.

In one aspect, the restriction requirements include at least one of: security policies specified by a user, a geographical location of a physical machine on which the VM is deployed, and requirements on processing of personal data on the VM and on the SVM.

In one aspect, the security agent selects either an optimal or a random SVM from the formed summary list, taking into account the current workload of the security virtual machines. Thus, for example, if the security agent is not connected to any SVM, the SVMs on the list of accessible SVMs which are not overloaded may be selected, among which the random SVM is selected for connection.

In one aspect, if a particular SVM on the list so formed and the virtual machine containing an security agent to be connected are both running on the very same physical machine, that SVM will have the highest priority for the selection and connection thereof, since that SVM is a local SVM, thus enabling the most optimal interaction, the other criteria of optimality being equal.

In another aspect, the summary list of SVMs is further restricted in its size, if the number of SVMs appearing on that list of SVMs exceeds a given value. This feature additionally allows a reduction in the number of interactions of the security agents of the virtual machines with the SVM during the process of polling for the current workload, thereby also further reducing the workload on the network. For example, a limiting of the size of the list of SVMs may be used when there is a high probability of that list containing hundreds or even thousands of SVMs. In addition, a prioritization of SVMs may also be applied when forming the summary list of SVMs of a given size.

In one aspect, when forming a list of SVMs which is limited in size, the prioritization of the SVMs appearing on the summary list of SVMs may have at least one of the following criteria:

the SVMs on the list should be from the same interaction area as the security agent of the virtual machine;

the list should contain only SVMs of a specified or more narrow interaction area with respect to the security agent;

the list of SVMs should contain SVMs residing on the same hypervisor as the security agent;

the list should contain for each security agent the most diverse SVMs from the same interaction area if the interaction area contains more SVMs than the list of SVMs should contain; and the list should not contain more than a specified number of SVMs.

Figure 4:
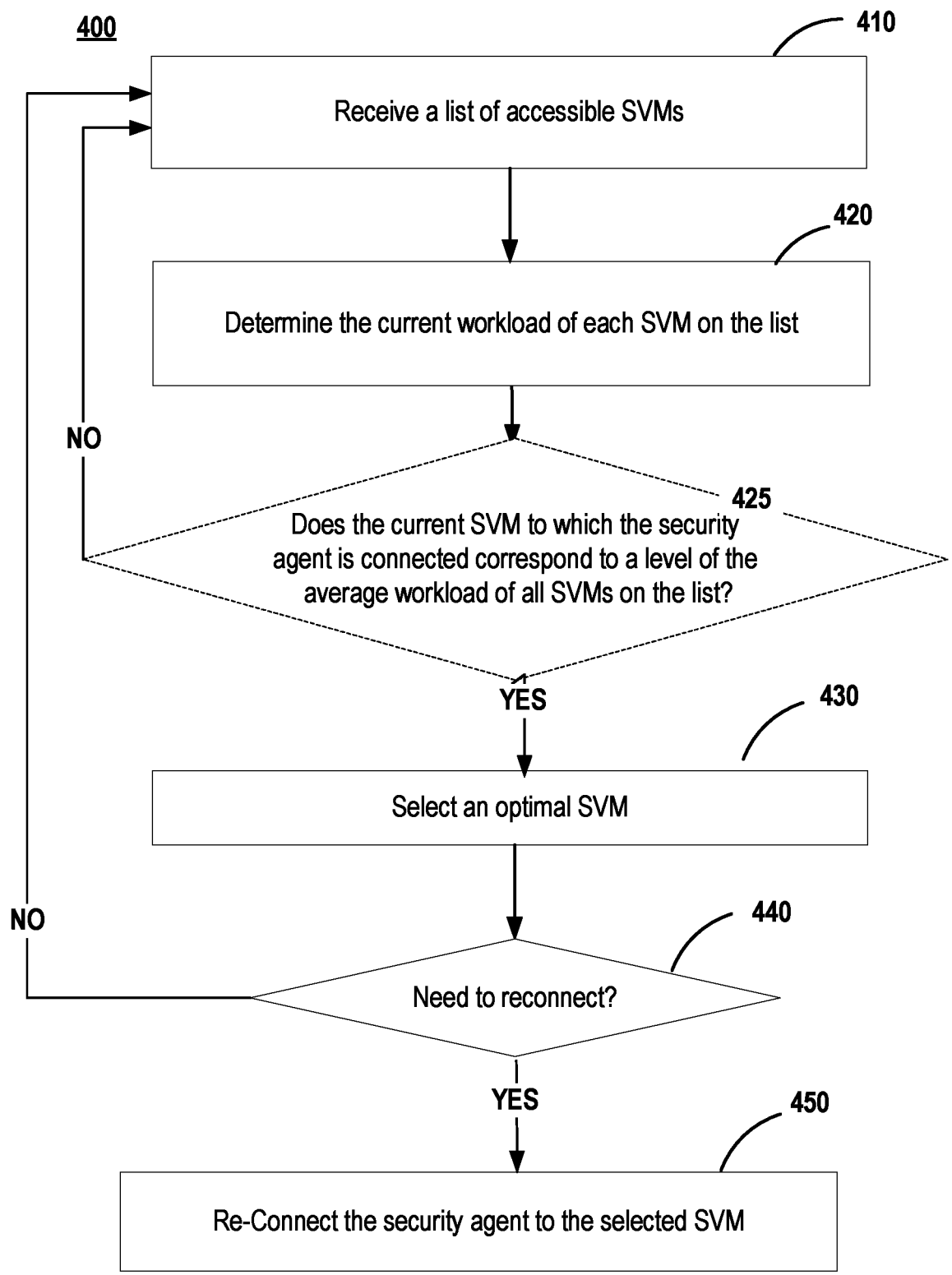
FIG. 4 illustrates a method for balancing a workload on a SVM while taking into account restriction requirements on interactions of the SVM with security agents installed on virtual machines.

FIG. 4 illustrates a method 400 for balancing a workload, by a security agent, on a security virtual machine (SVM). The balancing of workload is performed while taking into account restriction requirements on interactions of the SVM with security agents installed on virtual machines.

After connection to the SVM on the list of SVMs formed, the security agent periodically reviews the selection of the SVM. The interval for the review can be adjusted or is determined by trial and error. The will enable a balancing of the workload on the SVM without allowing the SVM to be overloaded. The balancing of the SVM workload makes it possible both to reduce the workload on those SVMs whose workload is higher than a certain level with respect to the average workload on all the SVMs and to increase the workload on those SVMs whose workload is less than a certain level with respect to the average workload on all the SVMs.

For the balancing of the workload of the SVM, it is necessary to determine the workload of each SVM. In one aspect, the workload of the SVM is determined by computing workload ratings of the SVM, wherein the workload rating is determined from a sum of a plurality of metrics having defined weights, the metrics including one or more of:

a number of protected security agents;

a mean waiting time (the delay caused by waiting in a queue for a remote interaction, in milliseconds);

a ping time (network delay, milliseconds); and a mean workload on a CPU and an input/output (an indirect indicator of the delay caused by the antivirus processing).

When the need for a balancing arises, the security agent performs the following steps. The need may arise both on the basis of the workload rating and on the basis of the specified periodic review for balancing.

In step 410, the method receives a list of accessible SVMs. For example, in the description of FIG. 3, the method of selecting SVMs for a virtual machine in a virtual infrastructure is described. In step 320 of FIG. 3, the method of selecting SVMs determines whether or not a network access to each SVM exists. Thus, in step 410, the security agent may receive the list of accessible SVMs, as determined using the method of FIG. 3. Similarly, in order to update the list of SVMs with which the security agent can interact, the following actions are performed:

the list of known SVMs is composed;

the SVMs not accessible in the network are excluded from the list;

the SVMs not having the required markers are excluded from the list; and the SVMs not conforming to the interaction area of the security agent in accordance with the restriction requirements on the interaction are excluded from the list.

In step 420, method 400 determines the current workload of each SVM contained on the list of accessible SVMs received in step 410, including the workload of current SVM to which the security agent is connected. In one aspect, the determination of the current workload comprises, the security agent either receiving the corresponding data on the SVMs from the integrator or the security agent polling each SVM on the list.

In step 425, the method determines whether the workload of the current SVM to which the security agent is connected corresponds to the level of the average workload on all SVMs. If the workload of the current SVM corresponds to the level of the average workload on all SVMs the method returns to step 410 after an established interval of time. Otherwise, the method proceeds to step 430. That is, if an overloading or under-loading of the SVM is found, the method moves on to step 430. An overloaded SVM is a SVM whose workload is greater than a defined level with respect to the average workload on all the SVMs. An under-loaded SVM is a SVM whose workload is less than a defined level with respect to the average workload on all the SVMs. It should be noted that the defined level of the average workload indicates a defined range of values. Alternatively, correction factors are used when comparing against the average workload in order to allow for hysteresis effects. It should be noted that step 425 is an optional step and may be eliminated.

In step 430, the method selects an optimal SVM in view of the current workload.

In step 440, the method determines whether or not there is a need for a reconnection to the selected SVM. When a need for the reconnection is determined, the method proceeds to step 450. Otherwise, the connection to the current SVM will remain in place, and the method returns to step 410 after an established interval of time.

In step 450, method 400 reconnects the security agent to the selected SVM. After reconnecting to the optimal SVM, the method may return to step 410 after an established interval of time.

In one aspect, the selection of the optimal SVM from the list consists:

1) forming a matrix of reconnection probabilities based on the current workloads of the accessible SVMs, where rows of the matrix represent SVM sources, columns of the matrix represent SVM receivers, and an intersection of a row and a column of the matrix is used to represent a probability of reconnecting the security agent from the SVM source to the SVM receiver; and 2) finding, by the security agent, the row that corresponds to its own SVM and, using a pseudorandom number generator with a uniform distribution, selecting one of the SVM receivers according to the probabilities.

The matrix of reconnection probabilities is recalculated whenever the need for a reconnection of an security agent is being considered. Then, based on the matrix of reconnection probabilities, a decision is made as to the need to reconnect the security agent from the current SVM to the optimal SVM.

If the sum of the probabilities in the row of the matrix of reconnection probabilities is not equal to 1, a variant is possible where the security agent will not be reconnected. If a SVM receiver has been selected, it will be the optimal one. The security agent will initiate the procedure for reconnection to the selected SVM.

In one aspect, the matrix of reconnection probabilities is filled in according to the following rules:

1) The security agents migrate first of all from the most heavily loaded SVM to the least heavily loaded SVM;

2) The security agents are not reconnected from those SVMs whose workload is less than a minimum value. In one aspect, the minimum value is designated or calculated in a form of an average workload on all the SVMs. In one aspect, one uses the larger of two values as the minimum value of the loading of the current SVM for a reconnection: a specified minimum workload threshold or a calculated average workload level on all the SVMs;

3) If the workload of the SVM to which the security agent is connected is higher than the average workload on all the SVMs on the list of SVMs, but the SVM is not overloaded, then the security agents connected to that SVM will be reconnected only to under-loaded SVMs; and 4) In one iteration, only a specified portion of a total number of security agents requiring a reconnection are reconnected.

In one aspect, the matrix of reconnection probabilities are formed, by the security agent 140, by formulating:

a vector of SVM sources, sorted by decreasing workload of the SVMs, a vector of SVM receivers, sorted by increasing workload of the SVMs, and a vector of the current workload of the SVM, the i-th element of the vector being equal to the current workload of the i-th SVM from the vector of SVM receivers.

Next, the security agent 140 calculates the mean value of the vector of the current workloads.

Then, the security agent 140 calculates the workload levels for the overloaded and under-loaded SVMs using the calculated mean value of the vector of the current workloads.

Then, the security agent 140 forms a matrix of reconnection probabilities, the matrix having N rows and M columns, where N corresponds to the length of the vector of SVM sources and M corresponds to the length of the vector of SVM receivers.

Then, the security agent 140 initializes the matrix of reconnection probabilities with zeroes.

Then, for each element in the vector of SVM sources, the security agent calculates the SVM workload; this should be determined for each SVM source.

Then, for each element in the vector of SVM sources, the probability of a reconnection from the SVM source to each SVM receiver is calculated.

In one aspect, the workload of the SVM is not decreased (i.e., the entire row in the matrix remains a zero row) when one of the following conditions is met:

the propagation workload is less than or equal to 0;

the workload, for the SVM source, is less than the minimum workload for reconnection from the SVM source; and the workload on the SVM source is less than the workload level for the overloaded SVMs, and the minimum calculated workload is greater than or equal to the workload level for the under-loaded SVMs.

For each element in the current workload vector, the workload which can be shifted to the corresponding SVM receiver is calculated. If the magnitude of the workload which can be shifted is less than or equal to zero, the method moves on to the next element of the current workload vector, in which case the element of the current workload vector is increased, and the workload in the vector of SVM sources is decreased, by a corresponding amount. Then, the method calculates the required probability of migration that will ensure a transfer of the necessary workload volume, taking into account the coefficients for the speed of the reconnection. The resulting probability is written into the matrix of reconnection probabilities in the appropriate cell. The result of carrying out this procedure is determining: the vector of SVM sources, the vector of SVM receivers, and the matrix of reconnection probabilities, which indicates the probability of a reconnection from the SVM sources to the SVM receivers.

In one aspect, the selection of the optimal SVM consists selecting based on:

1) generation of the vector of probabilities, directly, using a pseudorandom number generator with a uniform distribution; and 2) obtaining the vector of probabilities by forming the list of SVMs and calculating probabilities of connections to each of the SVMs on the list.

For example, suppose S represents the vector of SVMs, and P represents the vector of probabilities (a row in the matrix of reconnection probabilities), and P[i] represents the probability of a connection to S[i].

First, a random number is created between 0 and 1: RND=random (0,1). Then, the method determines the least k for which (P[0]+P[1]+ . . . +P[k])>=RND, where k is the sought index of the SVM receiver for the reconnection. The index is in the vector of SVM receivers. Then, a determination is made as to whether such k is found. If no such k is found, there will be no reconnection to another SVM. If such k is found, the security agent 140 connects to the SVM S[k].

As described above, the method of the present disclosure, e.g., method 300, allows the creation of a list of security virtual machines (SVMs) while taking account of specified limitations on the interaction area of the protective security agents of virtual machines (VMs) and the SVM for the subsequent automatic selection of a target SVM for subsequent connection and processing of requests to scan virtual machine data.

Then, method 400 may be used to perform a balancing of the workload on the security virtual machines utilizing the restriction of the area of selection of the security virtual machine for connection of an security agent residing on a virtual machine. Thus, the proposed solution will allow the formation, for each security agent, of a set of security virtual machines with which that security agent is entitled to interact, taking account of limitation requirements on the interaction of both the virtual machines with each other and those with the SVM. The limitation requirements include the various rules and security policies operating in the network where the virtual machine is deployed or to which the virtual machine migrates. Thus, the method of the present disclosure may be used for balancing workload on security virtual machines while allowing for restrictions related to the area of selection of the security virtual machine for connection to an security agent of a given virtual machine.

In one aspect, the determination of the current workload comprises at least one of: the security agent receiving data indicative of the workloads of the SVMs from an integrator and the security agent polling each SVM on the list for respective workload of the SVM.

In one aspect, the workload of the SVM is determined by computing workload ratings, wherein the workload rating is determined from a sum of a plurality of metrics having defined weights, the metrics including one or more of: a number of protected security agents, a mean waiting time, a ping time, and a mean workload on a CPU and on an input/output.

In one aspect, the minimum value for applying the second rule comprises a larger of: a first value that specifies a minimum workload threshold and a second value that is at the level of the average workload of all the SVMs on the list.

In one aspect, the selection of the optimal SVM from the list consists: forming the matrix of reconnection probabilities based on the current workloads of the accessible SVMs, where rows of the matrix represent SVM sources, columns of the matrix represent SVM receivers, and an intersection of a row and a column of the matrix is used to represent a probability of reconnecting the security agent from the SVM source to the SVM receiver; finding the row that corresponds to the current SVM of the security agent; and using a pseudorandom number generator with a uniform distribution, selecting one of the SVM receivers according to the probabilities.

In one aspect, the matrix of reconnection probabilities are formed by: formulating a vector of SVM sources, sorted by decreasing workload of the SVMs, a vector of SVM receivers, sorted by increasing workload of the SVMs, and a vector of the current workload of the SVM, the i-th element of the vector being equal to the current workload of the i-th SVM from the vector of SVM receivers; calculating a mean value of the vector of the current workloads; calculating workload levels for overloaded and under-loaded SVMs using the calculated mean value of the vector of the current workloads; forming the matrix having N rows and M columns, where N corresponds to a length of the vector of SVM sources and M corresponds to a length of the vector of SVM receivers; initializing the matrix of reconnection probabilities; and for each element in the vector of SVM sources, calculating the SVM workload and the probability of a reconnection from the SVM source to each SVM receiver.

In one aspect, the workload of the SVM is not decreased when at least one of the following conditions is met: a propagation workload is less than or equal to zero, the propagation workload being the workload which can be shifted to at least one of the SVM receivers; the workload, for the SVM source, is less than a minimum workload for reconnection from the SVM source; and the workload on the SVM source is less than the workload for the overloaded SVMs, and the minimum calculated workload is greater than or equal to the workload level for the under-loaded SVMs.

In one aspect, the list of security virtual machines is formed by: either the security agent or an integrator.

In one aspect, the integrator is used to determine a location of the security agent in a virtual infrastructure based on an identifier of the virtual machine on which the security agent is installed, and the list of security virtual machines is formed in accordance with the determined location of the security agent.

In one aspect, the formation of the list of security virtual machines comprises gathering information on the security virtual machines residing in a virtual infrastructure, wherein the gathering of the information comprises at least one of: reading corresponding security policies of the security virtual machines, wherein the read security policies include a list of addresses of the security virtual machines in the network, and polling each read security virtual machine to obtain markers associated with the polled security virtual machine and a specified level of an interaction area of the polled security virtual machine with regard to the security agent; sending a request to an integrator indicating a level of the interaction area required by the security agent, and receiving from the integrator a list of known security virtual machines; and broadcast polling of the entire virtual infrastructure to announce information in accordance with a predetermined periodicity.

In one aspect, the restriction requirements are used to establish the interaction area of the security agent which defines the boundaries within which the security virtual machines, to which the security agent can connect are located, the boundaries being characterized by locations in a virtual infrastructure.

In one aspect, the interaction area of the security agent is divided into any number of levels, the levels of the interaction area including at least one of: a level based on the physical machine on which the virtual machine is deployed; a level based on the cluster to which the virtual machine belongs; and a level based on the data center in which the physical machine containing the virtual machine resides.

In one aspect, the security agent comprises an antivirus security agent that performs an antivirus scan on the virtual machine and data being stored on the virtual machine, collects information, and interacts with the security virtual machine while performing the antivirus scan.

In one aspect, the restriction requirements are related to at least one of: security policies specified by a user; a geographical location of a physical machine on which the virtual machine is deployed, wherein the security agent is installed on the virtual machine; and requirements on processing of personal data on the virtual machine and on the security virtual machine.

In one aspect, the requirements on the processing of personal data contain restrictions corresponding to a law on personal data of a country on whose territory a server on which the virtual machine is located, wherein the security agent is installed on the virtual machine.

Figure 5:
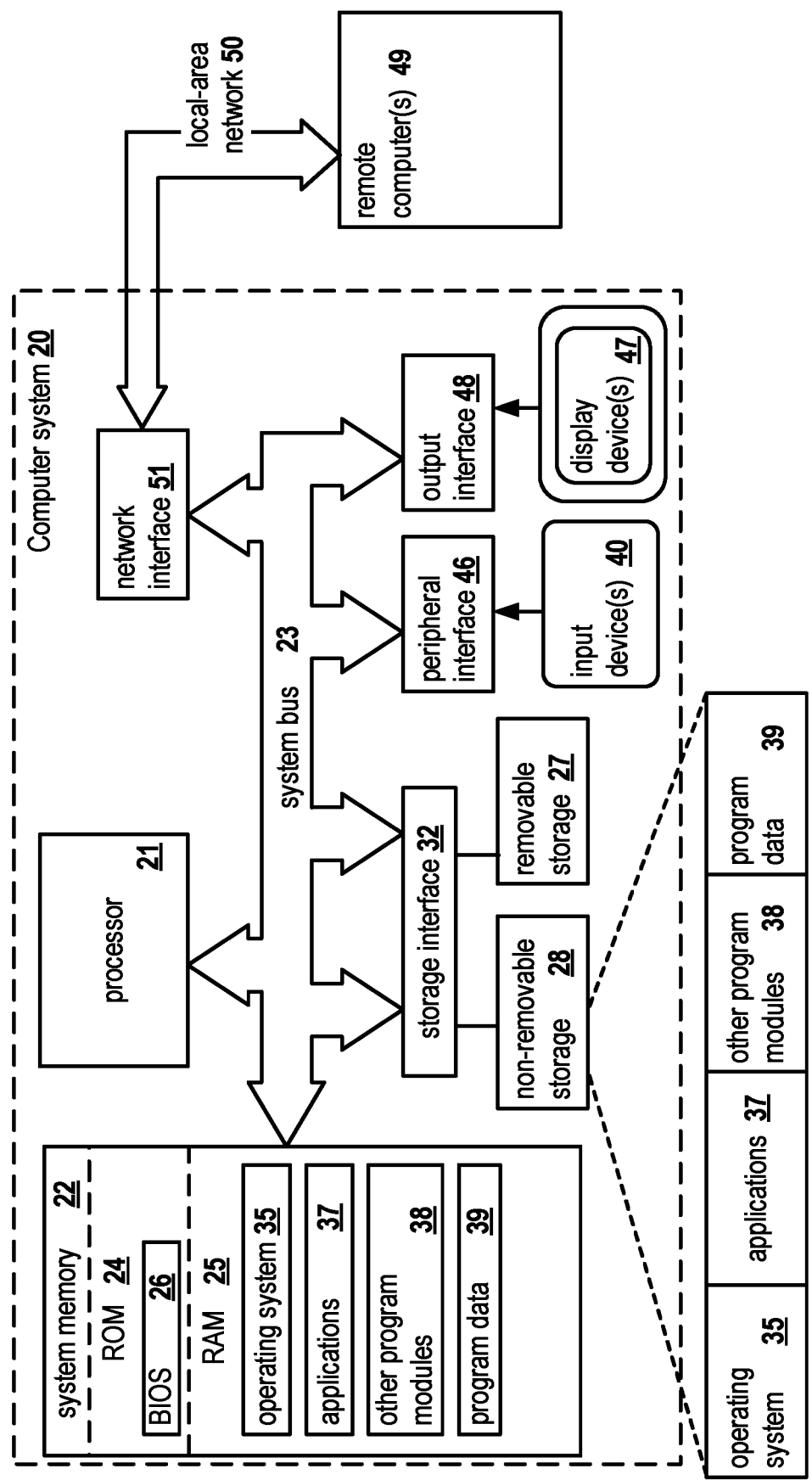
FIG. 5 presents an example of a general-purpose computer system on which aspects of the present disclosure can be implemented.

FIG. 5 is a block diagram illustrating a computer system 20 on which aspects of systems and methods for creating a list of security virtual machines from which a security virtual machine is selected for an security agent, for a subsequent connection of the security agent to the selected security virtual machine, may be implemented in accordance with exemplary aspects. It should be noted that the computer system 20 can correspond to a detection device, for example, as described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method of selecting security virtual machines (SVMs) for a virtual machine (VM) in a virtual infrastructure, the method comprising:
   forming a list of SVMs in the virtual infrastructure, wherein a SVM performs security tasks for the VM, and the VM includes a security agent configured to interact with the SVM;
   determining restriction requirements of the security agent and removing from the list all SVMs not conforming to restriction requirements on limits of interaction area of the security agent;
   polling each SVM remaining on the list to determine network accessibility of said SVM and removing from the list all inaccessible SVMs;
   for each accessible SVM remaining on the list, determining whether a marker of the SVM matches a marker of the security agent of the VM and removing from the list all SVMs whose markers do not match the marker of the security agent; and
   providing the list of remaining SVMs to the security agent of the VM.

2. The method of claim 1, wherein markers are assigned to SVMs by:
   dividing VMs in the virtual infrastructure into a plurality of zones based on locations and security policy requirements for data being processed on the VMs;

for each zone, assigning the locations of the VMs in the zone to a respective control group having a separate security policy;

assigning a distinct marker to each control group;

dividing SVMs into a plurality of groups of SVMs based on zones for which the SVMs perform security tasks; and for each group of SVMs, assigning, to all SVMs in the group, markers of the control groups for which the SVMs perform security tasks.

3. The method of claim 2, wherein the dividing of the SVMs into the plurality of groups of SVMs if further based on types of antivirus scans performed by the SVMs.

4. The method of claim 2, wherein the control group is used to restrict VMs to use a predesignated SVM.

5. The method of claim 1, wherein the restriction requirements on limits of interaction area of the security agent include restrictions based on geographical and virtual locations, wherein the virtual location is a location of a VM on which the security agent is installed, the location of the VM being a geographical location of a physical machine on which the VM is deployed.

6. The method of claim 1, wherein the interaction area of the security agent is divided into any number of levels, the levels of the interaction area including at least one of:
   a level based on the physical machine on which the virtual machine is deployed;
   a level based on the cluster to which the virtual machine belongs; and
   a level based on the data center in which the physical machine containing the virtual machine resides.

7. The method of claim 1, wherein the restriction requirements include at least one of:
   security policies specified by a user;
   a geographical location of a physical machine on which the VM is deployed; and
   requirements on processing of personal data on the VM and on the SVM.

8. A system of selecting security virtual machines (SVMs) for a virtual machine (VM) in a virtual infrastructure, comprising:
   at least one processor configured to:
      form a list of SVMs in the virtual infrastructure, wherein a SVM performs security tasks for the VM, and the VM includes a security agent configured to interact with the SVM;
      determine restriction requirements of the security agent and removing from the list all SVMs not conforming to restriction requirements on limits of interaction area of the security agent;
      poll each SVM remaining on the list to determine network accessibility of said SVM and removing from the list all inaccessible SVMs;
      for each accessible SVM remaining on the list, determine whether a marker of the SVM matches a marker of the security agent of the VM and removing from the list all SVMs whose markers do not match the marker of the security agent; and
      provide the list of remaining SVMs to the security agent of the VM.

9. The system of claim 8, wherein markers are assigned to SVMs by:
   divide VMs in the virtual infrastructure into a plurality of zones based on locations and security policy requirements for data being processed on the VMs;
   for each zone, assign the locations of the VMs in the zone to a respective control group having a separate security policy;
   assign a distinct marker to each control group;
   divide SVMs into a plurality of groups of SVMs based on zones for which the SVMs perform security tasks; and
   for each group of SVMs, assign, to all SVMs in the group, markers of the control groups for which the SVMs perform security tasks.

10. The system of claim 9, wherein the dividing of the SVMs into the plurality of groups of SVMs if further based on types of antivirus scans performed by the SVMs.

11. The system of claim 9, wherein the control group is used to restrict VMs to use a predesignated SVM.

12. The system of claim 8, wherein the restriction requirements on limits of interaction area of the security agent include restrictions based on geographical and virtual locations, wherein the virtual location is a location of a VM on which the security agent is installed, the location of the VM being a geographical location of a physical machine on which the VM is deployed.

13. The system of claim 8, wherein the interaction area of the security agent is divided into any number of levels, the levels of the interaction area including at least one of:
   a level based on the physical machine on which the virtual machine is deployed;
   a level based on the cluster to which the virtual machine belongs; and
   a level based on the data center in which the physical machine containing the virtual machine resides.

14. The system of claim 8, wherein the restriction requirements include at least one of:
   security policies specified by a user;
   a geographical location of a physical machine on which the VM is deployed; and
   requirements on processing of personal data on the VM and on the SVM.

15. A non-transitory computer readable medium storing thereon computer executable instructions of selecting security virtual machines (SVMs) for a virtual machine (VM) in a virtual infrastructure, including instructions for:
   forming a list of SVMs in the virtual infrastructure, wherein a SVM performs security tasks for the VM, and the VM includes a security agent configured to interact with the SVM;
   determining restriction requirements of the security agent and removing from the list all SVMs not conforming to restriction requirements on limits of interaction area of the security agent;
   polling each SVM remaining on the list to determine network accessibility of said SVM and removing from the list all inaccessible SVMs;
   for each accessible SVM remaining on the list, determining whether a marker of the SVM matches a marker of the security agent of the VM and removing from the list all SVMs whose markers do not match the marker of the security agent; and
   providing the list of remaining SVMs to the security agent of the VM.

16. The non-transitory computer readable medium of claim 15, wherein markers are assigned to SVMs by:
   dividing VMs in the virtual infrastructure into a plurality of zones based on locations and security policy requirements for data being processed on the VMs;
   for each zone, assigning the locations of the VMs in the zone to a respective control group having a separate security policy;

assigning a distinct marker to each control group;
dividing SVMs into a plurality of groups of SVMs based on zones for which the SVMs perform security tasks; and
for each group of SVMs, assigning, to all SVMs in the group, markers of the control groups for which the SVMs perform security tasks.

17. The non-transitory computer readable medium of claim 16, wherein the dividing of the SVMs into the plurality of groups of SVMs if further based on types of antivirus scans performed by the SVMs.

18. The non-transitory computer readable medium of claim 16, wherein the control group is used to restrict VMs to use a predesignated SVM.

19. The non-transitory computer readable medium of claim 15, wherein the restriction requirements on limits of interaction area of the security agent include restrictions based on geographical and virtual locations, wherein the virtual location is a location of a VM on which the security agent is installed, the location of the VM being a geographical location of a physical machine on which the VM is deployed.

20. The non-transitory computer readable medium of claim 15, wherein the interaction area of the security agent is divided into any number of levels, the levels of the interaction area including at least one of:
a level based on the physical machine on which the virtual machine is deployed;
a level based on the cluster to which the virtual machine belongs; and
a level based on the data center in which the physical machine containing the virtual machine resides.

* * * * *